United States Patent [19]
Derman

[11] 3,829,227
[45] Aug. 13, 1974

[54] LOCKING AND SEALING DEVICE

[75] Inventor: Karl Gustav Einar Derman, Partille, Sweden

[73] Assignee: Forsheda Ideutveckling AB, Varnamo, Sweden

[22] Filed: Nov. 9, 1972

[21] Appl. No.: 305,107

[30] Foreign Application Priority Data
Nov. 12, 1971 Sweden.............................. 14477/71

[52] U.S. Cl............... 403/377, 277/11, 277/235 R, 403/228, 277/94
[51] Int. Cl............................................ F16b 21/18
[58] Field of Search ..... 277/11, 9, 186, 189, 235 R, 277/DIG. 10, 183, 94; 85/8.8; 403/228, 377

[56] References Cited
UNITED STATES PATENTS

| | | | |
|---|---|---|---|
| 2,710,630 | 6/1955 | Greer.............................. | 277/235 R |
| 2,886,347 | 5/1959 | Kupchick........................ | 277/235 R |
| 3,001,806 | 9/1961 | Macks............................. | 277/42 X |
| 3,118,682 | 1/1964 | Fredd.............................. | 277/235 R |
| 3,162,456 | 12/1964 | Williams........................ | 277/235 R |

Primary Examiner—Samuel B. Rothberg
Attorney, Agent, or Firm—Albert L. Jeffers; Roger M. Rickert

[57] ABSTRACT

A locking ring having a number of arched metal segments and a number of arched rubber segments positioned between the metal segments. The rubber segments are fixedly connected with the metal segments by vulcanization. The locking ring when in mounted position is axially fixed in at least one direction to a surface and being resiliently expandable and/or compressible against the action of the rubber material.

3 Claims, 11 Drawing Figures

PATENTED AUG 13 1974 3,829,227

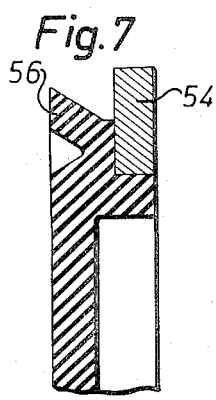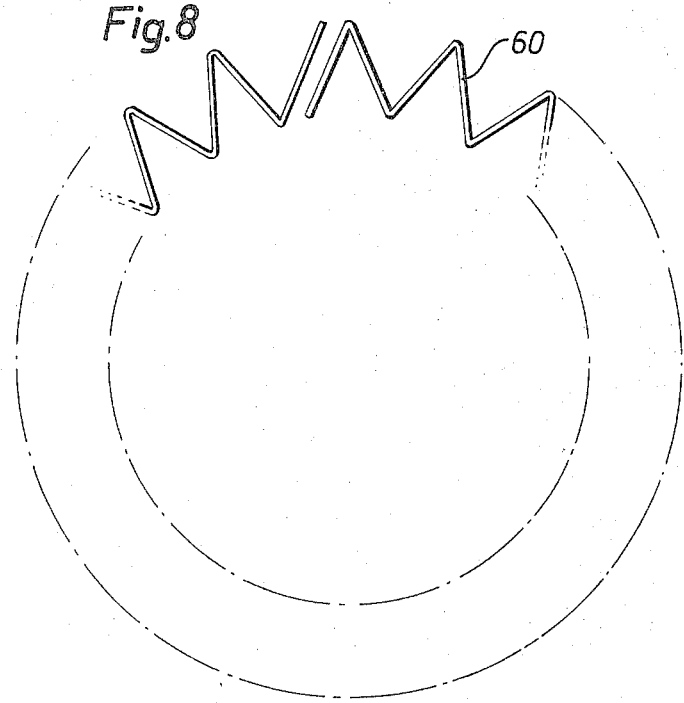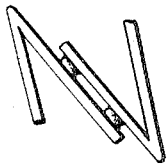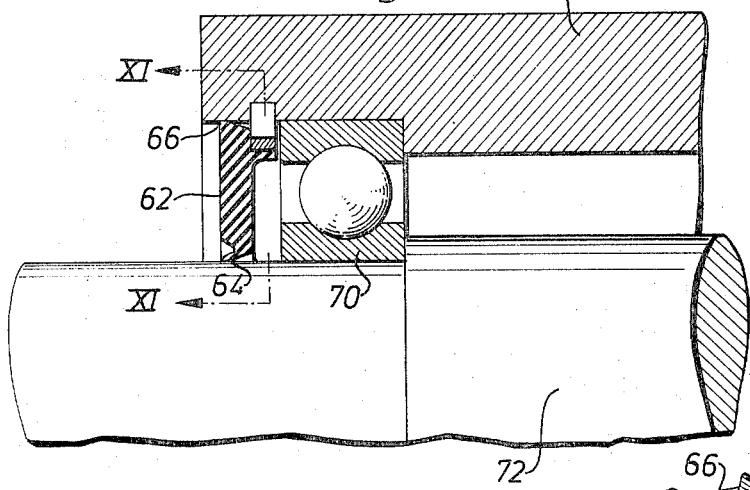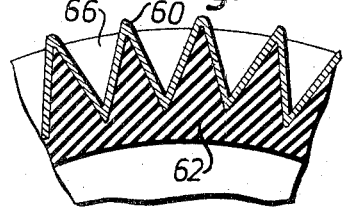

LOCKING AND SEALING DEVICE

The present invention relates to a locking device of the kind which is in the mounted position axially fixed to a usually cylindrical surface in at least the one direction.

Devices of this kind include the so-called snap ring. However, the snap ring has the drawback that in great dimensions it is expensive and difficult to mount.

Another drawback of the locking rings previously known is the fact that the rings have different designs dependent on if the rings are to be used for an inner or an outer cylindrical surface.

The object of the invention is to provide a locking device of the nature referred to which does not have the above drawbacks.

In accordance with the invention there is provided a locking ring which is in mounted position axially fixed in at least the one direction to a surface, preferably a cylindrical surface, by means of continuous or non-continuous ring having an elastic material, preferably rubber, fixed thereto, said ring being resiliently expandable and/or compressible against the action of said elastic material.

In a preferred embodiment of the locking device said ring consists of at least two segments connected with each other by means of said elastic material. It is preferred that the end surfaces of said segments are connected with each other by means of intermediate segments of said elastic material.

The invention is described in the following with reference to the accompanying drawings.

FIG. 7 is an exaggerated detail of FIG. 6;

FIG. 8 shows a corrugated strip of an embodiment of a locking device in accordance with the invention;

FIG. 9 is a detail of the jointing of the corrugated strip of the kind shown in FIG. 8;

FIG. 10 shows a locking and sealing arrangement including a locking and sealing ring comprising the corrugated strip of FIG. 8; and FIG. 11 is a section taken on line 11—11 of FIG. 10.

Figure 1:
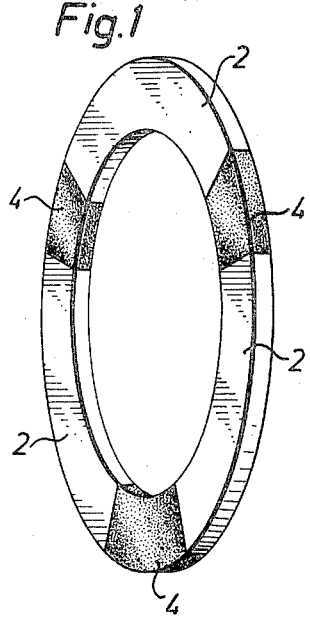
FIG. 1 is a perspective view of an embodiment of a locking ring in accordance with the invention.
Figure 2:
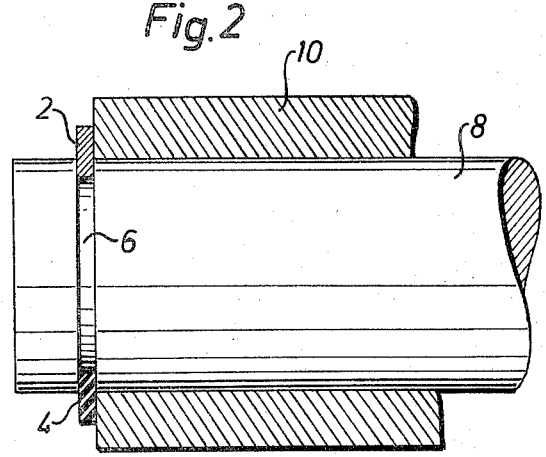
FIG. 2 is an axial section of a locking arrangement including the locking ring of FIG. 1.

A locking ring shown in FIG. 1 comprises three arched metal segments 2 and three arched rubber segments 4 positioned between the metal segments. The rubber segments are fixedly connected with the metal segments, for example, by vulcanization. A ring of this kind can be manufactured by dividing a metal ring in four equal portions and jointing three of these portions to a locking ring having the same diameter as the metal ring by means of intermediate rubber segments. Thus, the length of the three rubber segments 4 is the same as the length of one metal segment 2. Thanks to the intermediate elastic rubber segments 4 the diameter of the locking ring can be elastically increased or decreased, so that the ring can be expanded over a shaft or pushed into a hole to a groove formed in the shaft or the wall of the hole into which groove the ring snaps. The ring can be used for axially fixing a shaft in one direction in relation to a machine element, for example a roll bearing, surrounding the shaft. This application of the locking ring is shown in FIG. 2, wherein the locking ring is positioned in the groove 6 in the shaft 8 for constituting a stop face for a machine element 10 surrounding the shaft.

Of course, it is also possible to position a locking ring of the kind shown in FIG. 1 in an inner groove in an inner cylindrical surface. In this respect the locking ring is more advantageous than a snap ring which is designed either for inner or outer use. The locking ring of FIG. 1 can be used for an outer groove of a certain diameter as well as for an inner groove of another diameter.

Figure 3:
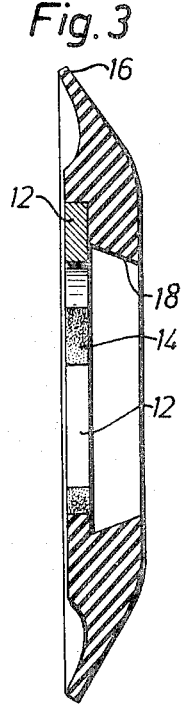
FIG. 3 is a section through a combined locking and sealing ring.
Figure 4:
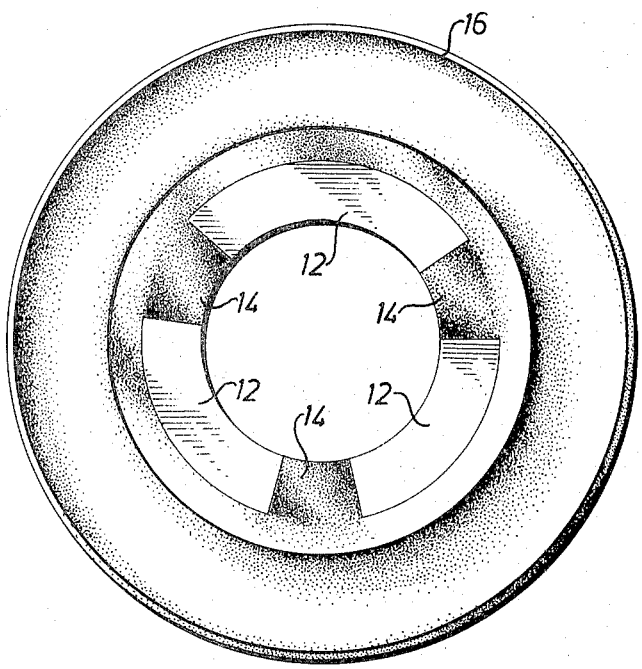
FIG. 4 is a plan view of the locking and sealing ring of FIG. 3.

In FIGS. 3 and 4 there is shown a combined locking and sealing ring, the locking portion of which is designed in the same way as the locking ring of FIG. 1. Thus, the ring has three metal segments 12 connected with each other by means of intermediate rubber segments 14. Besides, the ring has an outer sealing portion 16 and an inner sealing portion 18. All rubber portions of the combined locking and sealing ring are formed in one piece.

Figure 5:
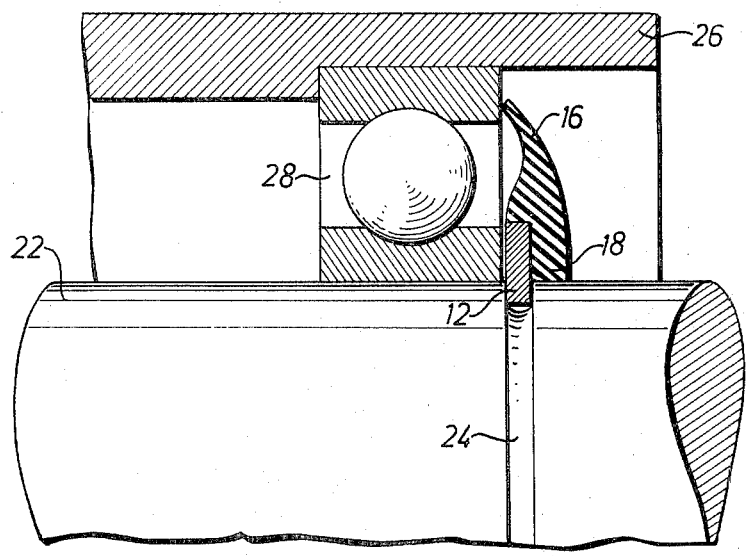
FIG. 5 shows the application of the locking and sealing ring of FIGS. 3 and 4.

In FIG. 5 there is shown how the combined locking and sealing ring of FIGS. 3 and 4 can be used. A shaft 22 is provided with a peripheral groove 24. Between the shaft 22 and a sleeve 26 is positioned a conventional ball bearing 28. A locking and sealing ring of the kind shown in FIGS. 3 and 4 is positioned in the groove 24. The outer sealing portion 16 of the ring contacts the outer ring of the bearing while the inner sealing portion 18 contacts the shaft. The locking and sealing ring axially fixes the bearing on the shaft 2 and seals the two spaces at each sides of the locking and sealing ring in relation to each other. Thus, there is not required any separate sealing device for protecting the bearing.

Figure 6:
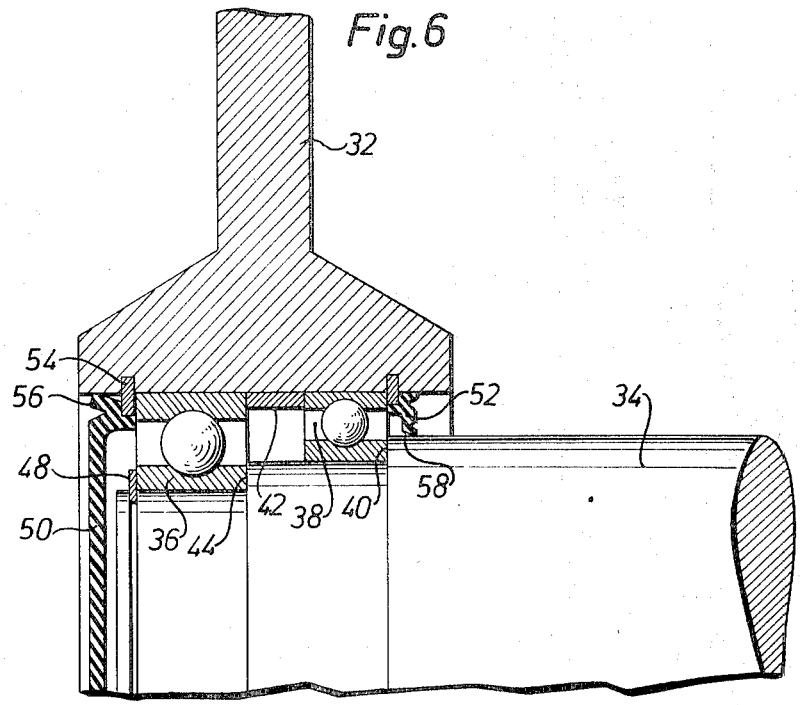
FIG. 6 shows a bearing arrangement for a wheel including locking and sealing devices in accordance with the invention.

In FIG. 6 there is shown a bearing and sealing arrangement for a guiding wheel. The use of the locking and sealing ring in accordance with the invention provides for a simplification of the machining of the guiding wheel by the fact that it is necessary only to provide the wheel with a through hole of uniform diameter and two inner grooves at the ends of the hole. Thus, the guiding wheel 32 is rotatably mounted on a shaft 34 by means of intermediate ball bearings 36 and 38 of conventional kind. The ball bearings are axially fixed to the shaft by means of a stop face 40, a ring 42 positioned between the bearings 36 and 38, a stop face 44 and a locking ring 48 positioned in a groove 46 in the shaft. For sealing the bearing arrangement and axially fixing the guiding wheel 32 on the ball bearings 36 and 38 the bearing and sealing device comprises an outer locking and sealing cap 50 and an inner locking and sealing ring 52. The locking and sealing portion of the cap 50 (shown in detail in FIG. 7) is preferably constituted by metal segments 54 and intermediate rubber segments (not shown) in the same way as shown in FIGS. 1–5. There is also a sealing lip 56 adapted to seal against the surface of the through hole of the guiding wheel 32.

At the edge adjacent the hole in the guiding wheel the locking and sealing ring 52 has the same design as the cap 50, that is metal segments, intermediate rubber segments and a sealing lip. At its inner periphery the ring 52 has a sealing lip 58 engaging the outer surface of the shaft.

In FIG. 8 there is shown a corrugated metal strip 60 adapted to be included in a sealing and locking ring. The strip 60 is intended to have the same function in a locking and sealing ring as the metal segments of the locking and sealing rings in accordance with the embodiments described above. The strip 60 can be open as shown in FIG. 8 or closed by means of welding spots as shown in FIG. 9. Sealing rings including the corrugated strip shown in FIGS. 8 or 9 can have the design and can be used in the way shown in FIGS. 10 and 11. The angular, inwards open spaces of the strip 60 are filled with rubber 61 making the strip elastically compressible and extensible. The strip is also provided with a sealing portion 62 having an inner sealing lip 64 and an outer sealing lip 66. Preferably the rubber material of the locking and sealing ring is designed in one portion. The locking and sealing ring is positioned in a groove in a wall 68 by the fact that the corrugated strip 60 projects into the groove for axially fixing a ball bearing 70 for a shaft 72 positioned in an opening in the wall 68. The inner sealing lip 64 sealingly engages the shaft 72, and the outer sealing lip 66 sealingly engages the wall 68.

A sealing and locking ring in accordance with the invention can also be used for connecting two pipes positioned with the inner surface of one of the pipes surrounding the outer surface of the other of the pipes. Preferably each of the surfaces has a peripheral groove for receiving the inner and outer edge portion, respectively, of the ring. In pushing the pipes together and positioning the ring in the grooves the necessary change of the diameter of the ring takes place by tilting the ring, i.e., such an elastic deformation of the ring that it becomes a frusto-conical shape. The ring can be provided with suitable sealing portions for providing a requested sealing action in the joint.

The invention can be modified within the scope of the following claims.

I claim:

1. A locking ring for axially fixing an annular member to a substantially cylindrical member where one of the members is provided with an annular groove and the other member is provided with a shoulder, the locking ring comprising a plurality of arched metal segments and a plurality of arched elastic segments, each adjacent pair of metal segments being separated by and bonded to an intervening elastic segment to form a generally flat resilient annular ring, the ring being deformable to place an annular part thereof in the annular groove with another annular part thereof engageable with the shoulder to limit relative axial movement of the two members.

2. The locking ring of claim 1 wherein the cylindrical member is a shaft and is the member provided with the annular groove and wherein the annular member comprises a two ring bearing one ring of which comprises the said shoulder, the arched elastic segments being circumferentially expandable to allow the ring to be passed over the shaft and into position in the groove.

3. The locking ring of claim 1 wherein the cylindrical member comprises a shaft having a two ring bearing thereon forming the said shoulder and wherein the annular member receives the shaft and bearing and is the member provided with the annular groove, the arched elastic segments being circumferentially compressible to allow the ring to be passed into the annular member and expand into the annular groove.

* * * * *